United States Patent Office 3,067,213
Patented Dec. 4, 1962

3,067,213
6,16-DIHALO-17-ACYLOXY-PROGESTERONES
Howard J. Ringold and Carl Djerassi, Mexico City, Mexico, assignors, by mesne assignments, to Syntex Corporation, a corporation of Panama
No Drawing. Filed May 13, 1959, Ser. No. 812,829
Claims priority, application Mexico May 15, 1958
3 Claims. (Cl. 260—397.4)

The present invention relates to novel cyclopentanophenanthrene compounds.

More particularly, it relates to the novel 16β-halo (chloro or bromo)-17α-acyloxy-progesterones which may further possess a fluorine, chlorine or methyl substituent at C–6α.

We have found that these compounds exhibit progestational activity and, furthermore, possess anti-androgenic and anti-estrogenic effects.

The novel compounds having the properties above set forth are illustrated by the following formula:

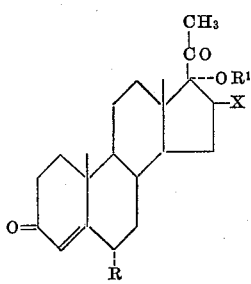

In the above formula R represents hydrogen, fluorine, chlorine or methyl, X represents chlorine or bromine and R¹ represents a hydrocarbon carboxylic acyl group of up to 12 carbon atoms, saturated or unsaturated, of straight or branched chain, cyclic or mixed cyclic-aliphatic; such 17-esters include, therefore, groups such as the acetate, propionate, butyrate, hemisuccinate, caproate, benzoate, trimethylacetate, t-butylacetate, cyclopentylpropionate, phenylpropionate, acetoxypropionate, glycinate or β-chloropropionate.

The above compounds were prepared by a process set forth in the following equation:

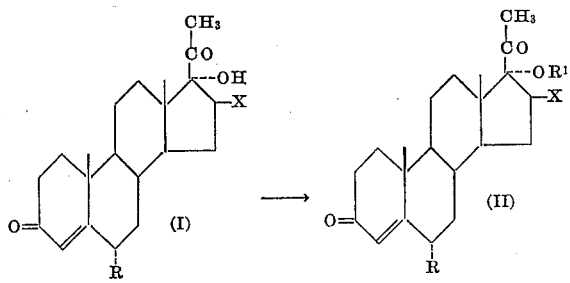

In the above equation X, R and R¹ represent the same groups as heretofore.

For the preparation of the novel compounds of the invention, we esterified the hydroxyl group of a 16β-halo-17α-hydroxy-progesterone or of its analogs further substituted at C–6α (I), with radicals of hydrocarbon carboxylic acids having up to 12 carbon atoms, and thus we produced the desired 16β-halo-17α-acyloxy-progesterones (II; R=H), or their analogs further substituted at C–6α (II; R=F, Cl or Me), respectively. This esterification was achieved by reaction with the anhydride of the corresponding carboxylic acid in a solvent inert to this reaction such as benzene or ethyl acetate in the presence of an acid catalyst preferably p-toluenesulfonic acid at room temperature.

Of the starting compounds there have been already described 16β-bromo-17α-hydroxy-progesterone (Romo et al. J. Org. Chem. 21, 902 (1956)). We obtained 16β-chloro-17α-hydroxy-progesterone by following the method described by Romo et al. (loc. cit.) for the preparation of the 16β-bromo-analog, that is, by treatment of 16α,17α-oxido-progesterone with hydrochloric acid. The method employed for preparing the so far unknown 16β-chloro and 16β-bromo analogs of 6α-methyl-17α-hydroxy-progesterone, is represented by the following equation:

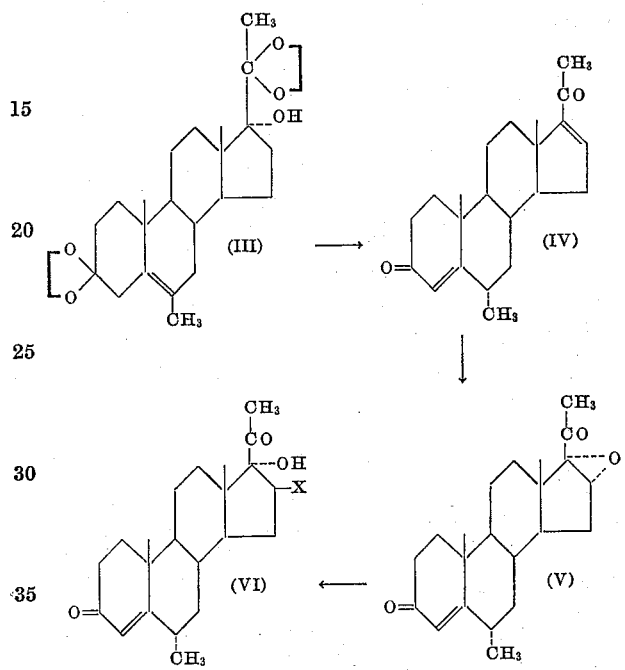

In the above equation X represents the same groups as heretofore.

We started from the known 6α-methyl-17α-hydroxy-progesterone, U.S. patent application Serial No. 679,763, filed August 22, 1957, which was converted into its 3,20-bis-cycloethyleneketal (III); the latter was dehydrated and the ketal groups were then hydrolyzed to produce 6α-methyl-Δ⁴,¹⁶-pregnadien-3,20-dione (IV), whose double bond between C–16 and C–17 was epoxidized to produce the compound of Formula V, which was in turn converted into the halohydrin VI.

The following specific examples serve to illustrate but are not intended to limit the present invention.

Example 1

A solution of 5 g. of 16α,17α-oxido-Δ⁵-pregnen-3β-ol-20-one in 100 cc. of chloroform was treated with an ether solution of permonophthalic acid containing 1.2 molar eqivalents of the peracid and the mixture was kept standing at room temperature for 20 hours. It was then diluted with water and the organic layer was separated, washed with water, aqueous sodium bicarbonate solution and finally again with water, dried over anhydrous sodium sulfate and evaporated to dryness. The residue consisted of a mixture of 5α,6α;16α,17α-bis-oxido-Δ⁵-pregnen-3β-ol-20-one and of 5β,6β;16α,17α-bis-oxido-Δ⁵-pregnen-3β-ol-20-one. The 5α,6α-isomer was separated by chromatography on neutral alumina.

A solution of 3 g. of the above compound in 300 cc. of a mixture of equal parts of ether and benzene was treated with 3 cc. of boron trifluoride etherate and the mixture was kept at room temperature for 3 hours and then washed with water, dried over anhydrous sodium sulfate and evaporated to dryness. The residue was purified by chromatography on neutral alumina, to give 6β-fluoro-16α,17α-oxido-pregnan-3β,5α-diol-20-one.

A solution of 3 g. of the above compound in 150 cc. of acetone was cooled to 0° C. and treated with an 8 N solution of chromic acid prepared from 1.6 g. of chromium trioxide, concentrated sulfuric acid and water; the addition was effected in the course of 2 minutes, with stirring and maintaining the temperature at around 0° C., under an atmosphere of nitrogen. The mixture was stirred for 5 minutes longer under an atmosphere of nitrogen and then it was diluted with water and extracted with ether; the extract was washed with water, dried over anhydrous sodium sulfate and evaporated to dryness. The residue crystallized from ether-hexane, thus yielding 6β-fluoro-16α,17α-oxido-pregnan-5α-ol-3,20-dione.

A mixture of 2 g. of the above compound and 100 cc. of glacial acetic acid was treated with a slow stream of dry hydrogen chloride for 2 hours, maintaining the temperature at around 15° C. The mixture was poured into water and the precipitate formed was collected, washed with water, dried and recrystallized from acetone-hexane. There was thus obtained 6α-fluoro-16β-chloro-Δ⁴-pregnen-17α-ol-3,20-dione.

*Example II*

A mixture of 5 g. of 16α,17α-oxido-Δ⁴-pregnen-3,20-dione, 50 cc. of anhydrous dioxane, 5 cc. of ethyl orthoformate and 150 mg. of p-toluenesulfonic acid was stirred for one and a half hours and then 4 cc. of pyridine and 100 cc. of water were added. The mixture was cooled and the precipitate was collected, washed with water, dried and recrystallized from aqueous methanol. There was thus obtained 3-ethoxy-16α,17α-oxido-Δ³,⁵-pregnadien-20-one.

A mixture of 5 g. of the above enol-ether, 2 g. of anhydrous sodium acetate and 100 cc. of acetone was treated with 32 cc. of water and the solution was cooled to a temperature between 0° and 5° C. There were then added 4 g. of N-chlorosuccinimide and 2 cc. of glacial acetic acid and the mixture was stirred at 0-5° C. for 60 minutes and diluted with 300 cc. of water. After keeping the mixture overnight in the refrigerator, the precipitate was collected, washed with water, dried in vacuo and recrystallized from acetone. There was thus obtained 6β-chloro-16α,17α-oxido-progesterone.

A slow stream of dry hydrogen chloride was introduced for one hour into a mixture of 2 g. of 6β-chloro-16α,17α-oxido-progesterone, and 100 cc. of glacial acetic acid, maintaining the temperature at around 15° C. It was then poured into water, the precipitate was collected, washed with water, dried and recrystallized from acetone-hexane, thus affording 6α,16β-dichloro-Δ⁴-pregnen-17α-ol-3,20-dione.

*Example III*

10 cc. of a saturated solution of dry hydrogen chloride in glacial acetic acid was added to a mixture of 10 g. of 16α,17α-oxido-progesterone and 80 cc. of glacial acetic acid, with stirring and maintaining the temperature below 20° C. After 30 minutes standing at room temperature, the mixture was poured into ice water and the precipitate formed was collected by filtration, washed with water, dried and recrystallized from chloroform-methanol. There was thus obtained 16β-chloro-17α-hydroxy-progesterone.

*Example IV*

A mixture of 8 g. of 6α-methyl-17α-hydroxy-progesterone, 160 cc. of anhydrous benzene, 56 cc. of ethyleneglycol distilled over sodium hydroxide and 0.9 g. of p-toluenesulfonic acid was refluxed for 8 hours with the use of an adapter for the removal of the water formed during the reaction. The cooled mixture was treated with aqueous sodium bicarbonate solution and the organic layer was separated, washed with water, dried over anhydrous sodium sulfate and evaporated to dryness. Crystallization of the residue from acetone-hexane yielded 6-methyl-3,20-bis-ethylenedioxy-Δ⁵-pregnen-17α-ol.

A solution of 6 g. of the above compound in 120 cc. of pyridine was cooled to 0° C. and slowly treated under stirring with 3.2 cc. of thionyl chloride, while the temperature was maintained at around 0° C. The mixture was kept at 0° C. for 12 hours and then poured into ice water; the precipitate was collected, washed with water, dried and used for the subsequent step without further purification.

The above crude product was dissolved in 120 cc. of acetone, mixed with 10 cc. of water and 600 mg. of p-toluenesulfonic acid and stirred at 15° C. for 24 hours. The mixture was poured into ice water and the precipitate was collected, washed with water, dried and recrystallized from acetone-hexane. There was thus obtained 6α-methyl-Δ⁴,¹⁶-pregnadien-3,20-dione.

To a solution of 5 g. of the above compound in 150 cc. of ethyl acetate there was added 80 cc. of a solution of perbenzoic acid in ethyl acetate containing 29 mg. of the reagent per cc. The mixture was kept in the dark at room temperature for 19 hours and then diluted with more ethyl acetate; the solution was washed with aqueous 5% sodium carbonate solution and then with 10% sodium chloride solution until neutral; the organic layer was dried over anhydrous sodium sulfate and evaporated to dryness under reduced pressure. The residue crystallized from acetone-hexane to furnish 6α-methyl-16α,17α-oxido-progesterone.

A solution of 3 g. of the above compound in 30 cc. of glacial acetic acid was treated with 3 cc. of a saturated solution of dry hydrogen chloride in glacial acetic acid, as described in Example III. The product was precipitated by the addition of water, filtered and recrystallized from chloroform-methanol, thus producing 6α-methyl-16β-chloro-17α-hydroxy-progesterone.

*Example V*

By substituting in the method of the previous example, the hydrogen chloride for hydrogen bromide, there was obtained 6α-methyl-16β-bromo-17α-hydroxy-progesterone.

*Example VI*

A solution of 5 g. of 16β-chloro-17α-hydroxy-progesterone in 500 cc. of dry benzene was mixed with 10 cc. of acetic anhydride and 1 g. of p-toluenesulfonic acid and the mixture was kept at room temperature for 24 hours. The benzene solution was washed with aqueous sodium bicarbonate solution and then with water to neutral, dried over anhydrous sodium sulfate and evaporated to dryness. The residue was purified by chromatography on neutral alumina, thus yielding 16β-chloro-17α-hydroxy-progesterone 17-acetate.

*Example VII*

By the same method of the previous example 16β-bromo-17α-hydroxy-progesterone was acetylated at C–17.

*Example VIII*

In the method of Example VI there was substituted the acetic anhydride for 20 cc. of caproic anhydride and the mixture was allowed to react for 4 days. The product was isolated by following the technique described in such example, thus producing 16β-chloro-17α-hydroxy-progesterone 17-caproate.

*Example IX*

The methods of the previous examples were applied to all of the 16β-halo (chloro or bromo)-17α-hydroxy-progesterones substituted at C–6α with fluorine, chlorine or methyl, and/or there were used other acid anhydrides of hydrocarbon carboxylic acids of up to 12 carbon atoms. There were thus prepared a great variety of 17-esters of the 16β-chloro and 16β-bromo analogs of 17α-hydroxy-progesterone, with or without the additional fluorine, chlorine or methyl substituent at C–6, including in addition to the acetates, propionates and caproates, the benzoates and cyclopentylpropionates.

We claim:
1. The hydrocarbon carboxylic esters of up to 12 carbon atoms of 6α,16β-dichloro-17α-hydroxyprogesterone.
2. The hydrocarbon carboxylic esters of up to 12 carbon atoms of 6α-fluoro-16β-chloro-17α-hydroxyprogesterone.
3. The hydrocarbon carboxylic esters of up to 12 carbon atoms of 6α-methyl-16β-chloro-17α-hydroxyprogesterone.

References Cited in the file of this patent
UNITED STATES PATENTS

| | | |
|---|---|---|
| 2,753,360 | Kaspar et al. | July 3, 1956 |
| 2,878,247 | Miramontes et al. | Mar. 17, 1959 |

OTHER REFERENCES

Romo et al.: J. Org. Chem., 21, pp. 902; 903–907 (1956).